United States Patent
Michalowitz et al.

(10) Patent No.: US 10,726,118 B2
(45) Date of Patent: Jul. 28, 2020

(54) SECURED COMPUTERIZED SYSTEM FOR CHILDREN AND/OR PRE-LITERATE/ILLITERATE USERS

(71) Applicant: GOOGALE (2009) LTD., Cesaria (IL)

(72) Inventors: Nir Michalowitz, Cesaria (IL); Michal Peled Rosenvald, Tel-Aviv (IL)

(73) Assignee: GOOGALE (2009) LTD., Cesaria (IL)

( * ) Notice: Subject to any disclaimer, the term of this patent is extended or adjusted under 35 U.S.C. 154(b) by 262 days.

(21) Appl. No.: 15/735,399

(22) PCT Filed: Jun. 16, 2016

(86) PCT No.: PCT/IL2016/050632
§ 371 (c)(1),
(2) Date: Dec. 11, 2017

(87) PCT Pub. No.: WO2016/203474
PCT Pub. Date: Dec. 22, 2016

(65) Prior Publication Data
US 2018/0203989 A1    Jul. 19, 2018

Related U.S. Application Data

(60) Provisional application No. 62/181,313, filed on Jun. 18, 2015.

(51) Int. Cl.
*G06F 21/00* (2013.01)
*G06F 21/36* (2013.01)
(Continued)

(52) U.S. Cl.
CPC ............ *G06F 21/36* (2013.01); *G06F 3/0484* (2013.01); *G06F 3/04883* (2013.01);
(Continued)

(58) Field of Classification Search
CPC ........ G06F 21/31; G06F 21/36; G06F 21/604; G06F 2221/2149; G06F 3/0484;
(Continued)

(56) References Cited

U.S. PATENT DOCUMENTS 5,559,961 A * 9/1996 Blonder .................. G06F 21/36
726/18
8,392,975 B1    3/2013 Raghunath
(Continued)

FOREIGN PATENT DOCUMENTS

| WO | 2004/111870 A1 | 12/2004 | |
|---|---|---|---|
| WO | WO-2004111870 A1 * | 12/2004 | ......... G06F 16/9535 |
| WO | 2014/144908 A1 | 9/2014 | |

OTHER PUBLICATIONS

Al-Khateeb et al. "Enhancing usability and security in click-based visual password systems." IADIS International Conference e-Society, 2010.
(Continued)

*Primary Examiner* — Joseph P Hirl
*Assistant Examiner* — Ka Shan Choy
(74) *Attorney, Agent, or Firm* — Oliff PLC

(57) ABSTRACT

A secured computerized system comprising a computerized environment secured to prevent access thereto, other than by end-users who have passed a what-you-know authentication test: what-you-know testing functionality for administering a what-you-know user authentication test to end-user/s, including presenting image/s to end-user, and approving end-user to enter the computerized environment if end-user correctly selects predetermined location/s within the image; and a graphic what-you-know test-configuring functionality for displaying system-selected location/s within the image; providing a graphic interface operative for accepting, from, end-user/s, a user-selected modification of system-selected location/s; and storing, for each individual end-user, the
(Continued)

user-selected modification as the individual end-user's predetermined location/s; or if no user-selected modification exists for an individual end-user, storing the system-selected location as the individual end-user's predetermined location.

30 Claims, 4 Drawing Sheets

(51) Int. Cl.
    *G06F 16/50*     (2019.01)
    *G06F 3/0488*     (2013.01)
    *G07C 9/00*     (2020.01)
    *G06F 21/31*     (2013.01)
    *G06F 3/0484*     (2013.01)
    *G06F 9/451*     (2018.01)
    *G06F 21/60*     (2013.01)

(52) U.S. Cl.
    CPC ............. *G06F 9/453* (2018.02); *G06F 16/50* (2019.01); *G06F 21/31* (2013.01); *G06F 21/604* (2013.01); *G07C 9/00* (2013.01); *G06F 2221/2149* (2013.01)

(58) Field of Classification Search
    CPC ...... G06F 3/04883; G06F 9/453; G06F 16/50; G06F 17/30244; G06F 21/00; G07C 9/00
    See application file for complete search history.

(56) References Cited

U.S. PATENT DOCUMENTS

| | | | |
|---|---|---|---|
| 8,554,835 B1 | 10/2013 | Williams | |
| 8,601,589 B2 | 12/2013 | Blagsvedt et al. | |
| 8,881,251 B1 * | 11/2014 | Hilger | H04L 63/083 |
| | | | 713/183 |
| 2003/0234824 A1 | 12/2003 | Litwiller | |
| 2006/0085845 A1 * | 4/2006 | Davis | G06F 21/31 |
| | | | 726/6 |
| 2006/0174339 A1 | 8/2006 | Tao | |
| 2006/0267276 A1 * | 11/2006 | Farmer, Jr. | A63F 9/10 |
| | | | 273/157 R |
| 2006/0287030 A1 | 12/2006 | Briggs et al. | |
| 2007/0277224 A1 | 11/2007 | Osborn et al. | |
| 2009/0217342 A1 | 8/2009 | Nadler | |
| 2009/0254829 A1 | 10/2009 | Rohde | |
| 2010/0218663 A1 | 9/2010 | Choi | |
| 2012/0011594 A1 * | 1/2012 | Nguyen | G06F 21/6218 |
| | | | 726/28 |
| 2012/0167199 A1 | 6/2012 | Riddiford | |
| 2013/0047252 A1 | 2/2013 | Johnson et al. | |
| 2013/0268775 A1 * | 10/2013 | Hawkins | G06F 21/64 |
| | | | 713/189 |
| 2013/0347087 A1 * | 12/2013 | Smith | G06F 21/36 |
| | | | 726/7 |
| 2014/0025760 A1 | 1/2014 | Shore et al. | |
| 2015/0178490 A1 | 6/2015 | Tamboly et al. | |

OTHER PUBLICATIONS

Mhlanga. "Graphical Password Authentication for Secure Social Networks," 2013.
Radhika et al. "Compare Usability and Security of Graphical User Authentication Approaches." International Journal of Computer Science and Mobile Computing, Sep. 2014.
http://www.darkreading.com/vulnerabilities-and-threats/windows-8-picture-passwords-easily-cracked/d/d-id/1111351?; Sep. 28, 2013.
"PowerSchool Parent Portal User Guide;" Pearson; PowerSchol 7.x Student Information System; May 2012; 26 pp.
U.S. Appl. No. 15/735,413, filed Dec. 11, 2017 in the name of Michalowitz.
U.S. Appl. No. 15/837,656, filed Dec. 11, 2017 in the name of Michalowitz et al.

* cited by examiner

FIG. 2

Step 1: The student Clicks on his name

Step 2: The system's testing functionality shows a picture associated with e.g. randomly selected for the student and prompts the student to input his password (e.g. click at the right places in the right order)

Step 3: Student requests assistance and the teacher approaches his work-station

Step 4: Teacher uses child's work-station to select an Option either for all end-users in her class or for an individual. E.g. Approve student's identity and enable her to immediately start tasks. OR see/ Modify the student's Password (go to step 5) OR activate system's e-learning functionality (go to step 6)

Step 5: interact with the test configuring functionality to Modify Password, e.g. by modifying, say by dragging, a display of an existing pictorial password including marked locations on an image

Step 6: Password training game guided by the system's e-learning functionality that typically speaks/ guides and encourages the student to learn (remember and accurately enter) her/his password

Fig. 4

In a first stage, the system is commanded by a processor to overlay on an image/picture n, e.g. as shown in Fig. 3, n (e.g. 3) numbered or otherwise ordered regions e.g. circles (e.g. with half transparent background) indicating the location and order of the password

↓

In a second stage the system is commanded by a processor to display n, e.g. 3 empty circles (e.g. with border and/or transparent background – no numbers) on the screen, typically overlaid over the image

↓

In a third stage the system is commanded by a processor to show just picture (image) with no overlay (hence system does not show circles on screen )

US 10,726,118 B2

SECURED COMPUTERIZED SYSTEM FOR CHILDREN AND/OR PRE-LITERATE/ILLITERATE USERS

REFERENCE TO CO-PENDING APPLICATIONS

None.

FIELD OF THIS DISCLOSURE

The present invention relates generally to child-operated systems and more particularly to child-operated computerized systems.

BACKGROUND FOR THIS DISCLOSURE

Conventional technology constituting background to certain embodiments of the present invention is described in the following publications inter alia:

Microsoft Windows 8 offers gesture-based passwords, set up e.g. by "choosing a photo from one's Picture Library folder and drawing three points on the image. The system accepts taps, lines and circles. Windows 8 subdivides the image into a 100×100 grid and stores the input points as grid coordinates". This feature was apparently proposed because "tracing a pattern on a familiar photograph is fun". However, researchers have complained that Microsoft's picture gesture authentication (PGA) is not secure, e.g. because users don't select points on their images randomly; instead they strongly tend to pick points such as eyes or certain objects. The resulting passwords enjoy less variability than randomly generated passwords hence are easier to crack. It has been suggested that the PGA be improved by providing "a picture-password-strength meter, similar to systems that prevent people from choosing weak text-based passwords".

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a system allowing pre-literate children to use pictorial passwords including changing their own passwords.

Certain embodiments of the present invention seek to provide a system training pre-literate children to remember and present their password, typically including audio feedback and gamification.

Certain embodiments of the present invention seek to provide a system in which security is provided for a restricted environment wholly or inter alia by allowing access of an end-user to the restricted environment if (and perhaps only if) a trusted user authenticates herself on the end-user's work-station as part of the end-user's work session and then authorizes access of the end-user to the restricted environment.

Certain embodiments of the present invention seek to provide a system which teaches life skills/rules/code of conduct of interaction with computerized networks, in a systematic, secure and fun manner. The system typically keeps statistics of login attempts and/or logs of training sessions so teachers can track students who need attention e.g. who violate code of conduct e.g. when a student spams, or tries to take the identity of, a different student. The system typically provides alerts to child end-users of such violations.

Certain embodiments of the present invention seek to provide a picture-password based system for access control, cocooned within additional layers of security, such that the relatively low level of security that may be provided by certain pictorial passport schemes is not problematic.

Certain embodiments of the present invention seek to provide to provide a computerized system for children in which conventional use of (a) username and (b) password for access control is replaced by, respectively:

(a) selection (from among a group of icons e.g. corresponding to kids in the child's class) of a pictorial icon pre-defined for each child by a trusted user e.g. teacher defined as trusted typically for a specific group of children; and (b) entry of a typically picture-based password memorable to and produceable by a pre-literate or semi-literate child such as selecting a sequence of locations within a particular picture, or selecting one or more pictures. e.g. in sequence, from among many.

Certain embodiments of the present invention seek to provide a system having various combinations of the above characteristics.

The present invention typically includes at least the following embodiments:

Embodiment 1

A secured computerized system comprising:

a computerized environment secured to prevent access thereto, other than by end-users who have passed a what-you-know authentication test;

a what-you-know testing functionality operative for administering a what-you-know user authentication test to at least one end-user, including presenting at least one image to an end-user, and using a processor for approving the end-user to enter the computerized environment if the end-user correctly selects at least one predetermined location within the image; and a graphic what-you-know test-configuring functionality operative for:
  displaying at least one system-selected location within the image;
  providing a graphic interface operative for accepting, from at least one end-user, a user-selected modification of the at least one system-selected location; and
  storing in a computer-implemented memory, for each individual end-user, the user-selected modification as the individual end-user's at least one predetermined location; or if no user-selected modification exists for an individual end-user, storing the system-selected location as the individual end-user's predetermined location.

A particular advantage of embodiments which include some or all of the above elements, is that the system typically assigns suitable locations within a given image to each user. When the choice of locations is left to the user, the user (as is the case in prior art PGA systems) tends to select certain easy-to-guess locations yielding a low level of security. In contrast, the system may for example assign a possibly randomly selected location from among a large universe of locations not limited to a small set of obvious choices such as the eyes of human figures in a scene. Alternatively the system may non-randomly assign locations to users but may do so such that a wide variety of locations are assigned. For example, the system or a teacher-user thereof may assign easy or difficult locations to different users depending on stored system knowledge regarding the level of skill of each user. For example, age may be used as a rough indicator of skill since younger children are generally less skillful than those who are older in remembering and selecting locations in an image.

Embodiment 2

A system according to any of the preceding embodiments wherein the at least one location comprises a point location and an end-user is deemed by the what-you-know testing functionality to have correctly selected a predetermined location if s/he has selected a location on the image as presented, whose distance from the point location is no more than a predetermined maximum, thereby to maintain a predetermined precision level.

Embodiment 3

A system according to any of the preceding embodiments wherein the test-configuring interface is operative for randomly selecting an image to be displayed, from among a multiplicity of images.

Embodiment 4

A system according to any of the preceding embodiments and also comprising a library of images storing a multiplicity of images, from which an image is selected for presentation.

Embodiment 5

A system according to any of the preceding embodiments wherein at least one system-selected location within an individual image comprises a location within the individual image which is pre-stored in conjunction with the individual image.

Embodiment 6

A system according to any of the preceding embodiments wherein at least one system-selected location within an individual image comprises a location of a feature within the individual image which is detected using a feature-detection algorithm.

Embodiment 7

A system according to any of the preceding embodiments wherein the feature comprises a predetermined location along an edge.

Embodiment 8

A system according to any of the preceding embodiments wherein the feature comprises a corner.

Embodiment 9

A system according to any of the preceding embodiments wherein at least one location is pre-stored in association with a characterization of the location as being suited to certain end-users and wherein the system-selected location is selected based at least partly on the characterization.

For example, different locations in an image may be characterized, e.g. by a graphic artist supplying the image, as more or less difficult for a child to find. Then, for young children, locations within the image may be selected randomly from only those locations in the image which are less difficult. For older children, locations within the image may be selected randomly from all locations in the image or only those locations in the image which are more difficult.

Edge detection algorithms include, for example, Canny edge detection, Edge thinning, Differential edge detection and Phase congruency-based edge detection. Corner detection algorithms include, for example, the Moravec corner detection algorithm, the Harris & Stephens/Plessey/Shi-Tomasi corner detection algorithm, the Förstner corner detector, the multi-scale Harris operator, the Wang and Brady corner detection algorithm, the SUSAN corner detector, and the Trajkovic and Hedley corner detector.

Embodiment 10

A system according to any of the preceding embodiments wherein the presenting at least one image comprises presenting an image selected from among a multiplicity of images pre-selected to include (a) areas of distinct color easily distinguishable by users as opposed to smoothly varying color; and/or (b) features which are both (b-1) numerous enough to provide a predetermined level of security; and/or (b-2) far enough apart to facilitate selection by an end-user capable of a predetermined level of precision.

One way of ensuring this is to provide a library of images designed by graphic artists given all or any subset of criteria a, b-1 and b-2; for example, the graphic artist may be informed that a child can select features at a level of accuracy of 0.5 cm and that presence of 50 features is sufficient to provide the desirable level of security. The graphic artist may rate some locations as easy (such as the eye in a side-view of an animal in which only 1 eye is visible), others as intermediate (such as the right eye in a front-view of an animal in which both eyes are visible) and still others as difficult (such as the tip of an optopus's $6^{th}$ leg from the right) or very difficult (such as the $10^{th}$ tile in the $3^{rd}$ row of a roof including 12 rows each having 15 tiles).

Embodiment 11

A system according to any of the preceding embodiments wherein the user-selected modification is entered by dragging from a current location and clicking to indicate a desired new location.

Embodiment 12

A system according to any of the preceding embodiments and wherein a global trusted authority defines a plurality of "local authority" end-users and a corresponding plurality of groups of end-users, wherein each "local authority" end-user is known by the trusted authority to be personally acquainted with all end-users in the corresponding group from among the plurality of groups.

For example, if each group of end-users is a group of children in a single classroom, the "local authority" end-user may be the class's teacher, who may be authorized by a trusted authority such as a computerized system under the control of the Board of Education or Ministry of Education or local municipality.

Embodiment 13

A system according to any of the preceding embodiments wherein the system also comprises an access control override functionality operative to allow any individual "local authority" end-user, from among the plurality of "local authority" end-users, to manually authorize access to the computerized environment, but only for end-users within an individual group, from among the plurality of groups of end-users, which corresponds to the individual "local authority" end-user, thereby to provide manual over-riding of the testing user interface by local authorities.

Embodiment 14

A system according to any of the preceding embodiments wherein the at least one predetermined location comprises a plurality of predetermined locations.

Embodiment 15

A system according to any of the preceding embodiments wherein the plurality of predetermined locations comprises a sequence of predetermined locations and the approving comprises approving the end-user to enter the computerized environment if the end-user enters the plurality of predetermined locations in a correct order which corresponds to the sequence.

Embodiment 16

A system according to any of the preceding embodiments wherein at least one of the user interfaces includes a call-local-authority option and wherein the override functionality is activated only after the call-local-authority option is selected.

For example, in some embodiments, a call-local authority button may be provided which, if clicked, cause a modal pop-up to appear requesting a teacher or other local authority to identify him/herself by entering a PIN, unique to each local authority, which is distributed to each local authority by the global trusted authority. Once the PIN has been entered successfully, a teacher options panel may be displayed, allowing the teacher to select at least one option from among: utilizing his or her override functionality for one particular child, changing at least one of the system-selected locations for that one particular child; or allowing that one particular child to drill his predetermined locations until the child fully remembers them. According to certain embodiments, the above process is repeated separately for each child using the system who requires teacher assistance and a teacher who enters his PIN can then only select one or more of the above functions, for one particular child in his group; selecting function/s for another, second, child in his group requires the teacher, according to certain embodiments, to re-enter his PIN on the second child's work station.

Embodiment 17

A system according to any of the preceding embodiments wherein the override functionality is activated only after the local authority has successfully identified herself/himself to the system.

Embodiment 18

A system according to any of the preceding embodiments wherein the system also comprises an e-learning functionality operative to train a child to remember "his" at least one predetermined location.

Embodiment 19

A system according to any of the preceding embodiments wherein the e-learning functionality gives the end-user audio feedback.

Embodiment 20

A system according to any of the preceding embodiments wherein the e-learning functionality includes gamification functionality.

Embodiment 21

A system according to any of the preceding to embodiments wherein the system also comprises a test-configuration override functionality operative to allow any individual "local authority" end-user, from among the plurality of "local authority" end-users, to change at least one the system-selected location, but only for end-users within an individual group, from among the plurality of groups of end-users, which corresponds to the individual "local authority" end-user.

Embodiment 22

A system according to any of the preceding embodiments wherein the system also comprises a test-configuration override functionality operative to allow any individual "local authority" end-user, from among the plurality of "local authority" end-users, to, to select the image for presentation, but only to end-users within an individual group, from among the plurality of groups of end-users, which corresponds to the individual "local authority" end-user.

Embodiment 23

A system according to any of the preceding embodiments wherein the e-learning functionality provides at least 2 of the following learning stages: a first learning stage in which the at least one predetermined location is marked until the end-user has completed his selection thereof; a second learning stage in which the at least one predetermined location is marked for a period of time shorter than that required by a typical end-user to complete his selection of the location; and a third learning stage in which the at least one predetermined location is not marked but in which feedback is provided after the end-user has completed his selection of locations which he believes comprise the predetermined locations.

Embodiment 24

A system according to any of the preceding embodiments wherein in one learning stage a hint of the proper sequence in which a plurality of predetermined locations must be selected is provided, and in a subsequent learning stage, a hint indicating only whereabouts of the plurality of predetermined locations without indicating the sequence thereof, is provided.

Embodiment 25

A system according to any of the preceding embodiments wherein the access is granted by the what-you-know testing functionality only to low-threat child end-users pre-authorized by trusted special users.

Embodiment 26

A system according to any of the preceding embodiments wherein the access is granted to an end-user logged onto a work-station thereby to define a work-session, if a trusted user authenticates herself on the end-user's work-station as part of the end-user's work session and then authorizes access for the end-user.

Embodiment 27

A computer program product, comprising a non-transitory tangible computer readable medium having computer readable program code embodied therein, the computer readable program code adapted to be executed to implement a method for securing a computerized environment to prevent access thereto, other than by end-users who have passed a what-you-know authentication test, the method comprising the following operations.

Using a what-you-know testing functionality for administering a what-you-know user authentication test to at least one end-user, including presenting at least one image to an end-user, and using a processor for approving the end-user to enter the computerized environment if the end-user correctly selects at least one predetermined location within the image; and Providing a graphic what-you-know test-configuring functionality operative for displaying at least one system-selected location within the image; for controlling a graphic interface operative for accepting, from at least one end-user, a user-selected modification of the at least one system-selected location; and for controlling storage in a computer-implemented memory, for each individual end-user, of the user-selected modification as the individual end-user's at least one predetermined location; or if no user-selected modification exists for an individual end-user, storing the system-selected location as the individual end-user's predetermined location.

Embodiment 28

A secured computerized method comprising:

Providing a computerized environment secured to prevent access thereto, other than by end-users who have passed a what-you-know authentication test;

Using a what-you-know testing functionality operative for administering a what-you-know user authentication test to at least one end-user, including presenting at least one image to an end-user, and using a processor for approving the end-user to enter the computerized environment if the end-user correctly selects at least one predetermined location within the image; and Providing a graphic what-you-know test-configuring functionality operative for displaying at least one system-selected location within the image; providing a graphic interface operative for accepting, from at least one end-user, a user-selected modification of the at least one system-selected location; and storing in a computer-implemented memory, for each individual end-user, the user-selected modification as the individual end-user's at least one predetermined location; or if no user-selected modification exists for an individual end-user, storing the system-selected location as the individual end-user's predetermined location.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical. e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading". "calculating", "determining", "generating", "reassessing", "classifying", "generating", "producing". "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 2, 4 are simplified flowchart illustrations of methods provided in accordance with certain embodiments and useful either separately or in combination, e.g. in conjunction with the system of FIG. 1. The method of FIGS. 2, 4 typically comprises some or all of the illustrated operations, suitably ordered e.g. as shown.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments include an educational interactive platform for use in educational facilities such as elementary schools, special education facilities, and kindergartens, with parental- or teacher-supervision of specific functionalities, typically including a social network for children.

Figure 1:
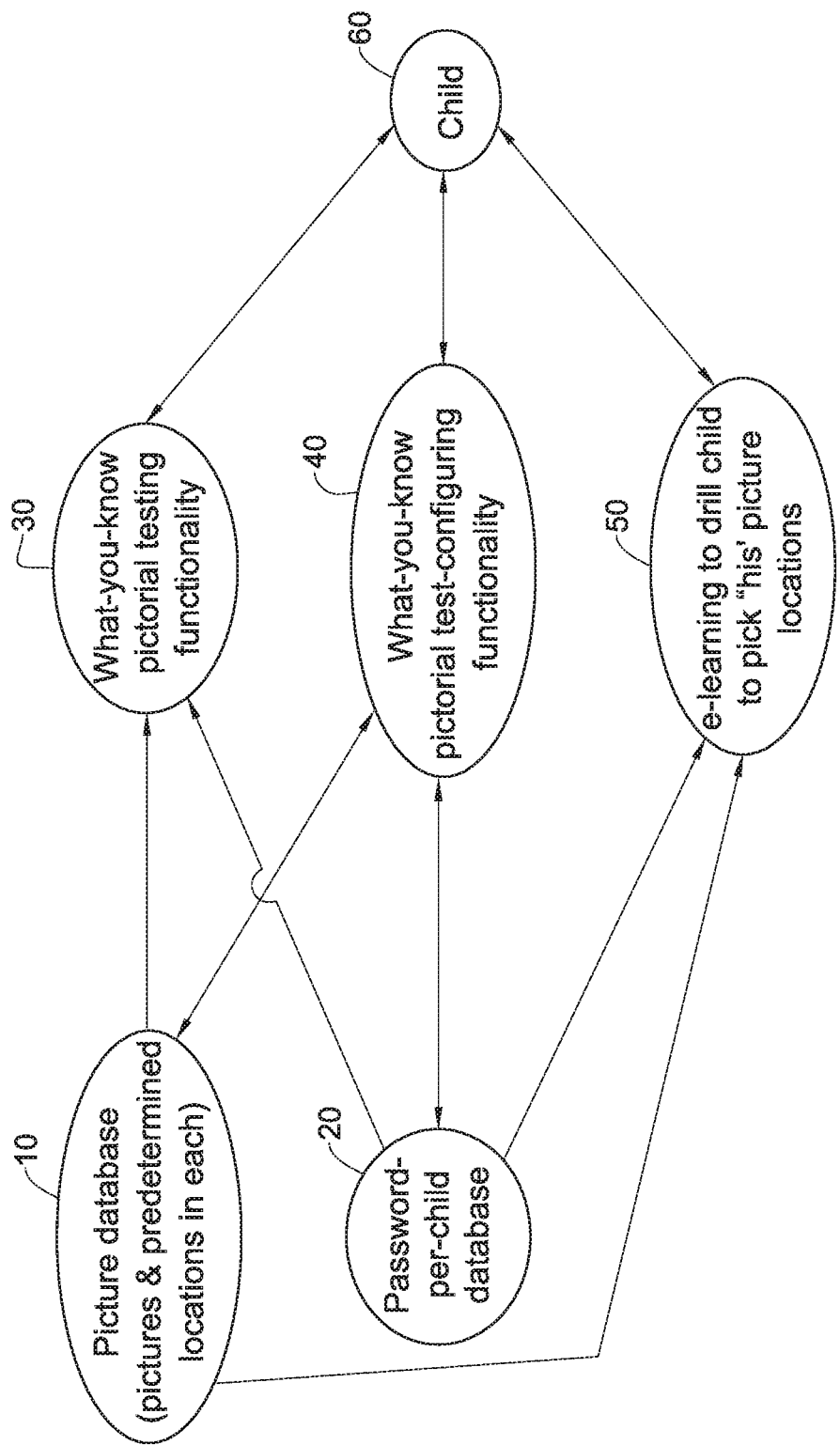
FIG. 1 is a simplified functional block diagram illustration of a pictorial password system protecting access to a secured environment such as a secured closed network, providing access only to users who have passed a what-you-know authentication test based on a pictorial password; some or all of the illustrated blocks may be provided.

FIG. 1 is a simplified functional block diagram illustration of a pictorial password system protecting access to a secured environment such as a secured closed network, providing access only to users who have passed a what-you-know authentication test.

Typically, the network security is not solely based on the pictorial password system; instead other layer/s of security may be provided since pictorial password systems may not be as secure as is required by the total situation. For example:

some users such as unknown adults may be totally barred from gaining access to the system; and/or some users may gain access to the system if authorized by trusted special users; and/or access is granted responsive to presentation of a pictorial password, only to end-users pre-authorized by trusted special users; for example, only to children pre-registered by a trusted adult caregiver thereof. This provides a double or triple layer of security: the what-you-know security of the pictorial password; and/or the fact that the only end-users eligible to interact with the what-you-know testing functionality are those authorized by trusted special users (kindergarten teachers e.g.); and/or the fact that the only end-users eligible to interact with the what-you-know testing functionality are low-threat end-users such as small children.

Some or all (any suitable subset) of the following may be provided:

a. a picture database/repository/library 10 storing digital images and typically, predetermined locations in each b. a password-per-child database/repository/library 20 storing, for each child-user, a pointer to "his" picture in library 10 and indication of "his" set or sequence of locations (typically a subset of the predetermined locations defined within "his" picture in library 10)

c. what-you-know pictorial testing functionality 30 operative to grant a child-user access to the secured environment if and only if the child-user successfully presents his password by indicating on "his picture", "his" set or sequence of locations d. what-you-know pictorial test-configuring functionality 40 operative to allow a user such as a child or his teacher, to select a picture e.g. from the database 10 and to select locations therewithin for storage in database 20; typically by using an input device to move pre-selected locations from place to place within the picture the user has selected; and e. e-learning functionality 60 to drill a child (60) to reliably pick "his' picture locations, typically using gamification.

Typically, an override by teacher option is provided, e.g. so child will not get too frustrated. The override allows a child to get in the password-protected secured environment even without a password he's forgotten at the discretion of the child's teacher subsequent to her identifying herself e.g. using a PIN.

According to certain embodiments, a what-you-know testing functionality assigns a pictorial password to each child; this assignment may be stored and maintained and updated as appropriate in a suitable computer database. The password may be system-assigned or may be determined for the what-you-know testing functionality by the teacher using her teacher interface or may be defined by the child himself, typically under adult supervision. Typically, the child is shown a picture by the what-you-know testing functionality e.g. a randomly selected or teacher/child user-selected one of a library of available pictures. Assignment of picture to child is typically mediated by the test-configuring functionality described herein. The password may then comprise a sequence or set of locations e.g. zero-dimension point locations (or larger locations) within the picture which the child selects, e.g. using a mouse. Each point location must typically be selected with a typically predefined level of precision, such as within a uniformly sized (or non-uniformly sized e.g. larger/smaller level/s of precision for larger/smaller objects defined within the picture), circle around each point location. For example, the system might predefine that a point location is correctly selected by the child if the child clicks on a location within a 1-cm radius of the point location. The child is deemed by the what-you-know testing functionality to have presented his password, if he successfully selects the locations allocated to him, each within its (or a uniform) predetermined precision level.

According to certain embodiments, each picture in the picture database is stored as a collection of objects such as animals, tools, foods, plants, household objects or toys whose locations within the picture grid are known; in this case, the password may comprise a sequence of set of objects which may each be deemed to have been successfully selected if the child positions his user input device e.g. cursor within the borders of each object rather than within a predefined level of precision defined around a point.

It is appreciated that adult users, once assigned (e.g. self-assigned) a password, typically including a sequence of alphanumeric characters, succeed in remembering that password and/or in storing it in a secure location. Child users may not be capable of either of these skills. Nonetheless, child users are assigned a password according to certain embodiments, however, typically, gamified password drilling functionality also termed herein "e-learning functionality", is provided by the system's e-learning functionality to teach the child his password. Typically, a suitable e-learning branched sequence is defined within the e-learning functionality, for example toward the top of the tree the child is shown "his" picture in which "his" 3 (say) locations which constitute his password is marked e.g. by a circle surrounding that location, typically having a radius corresponding to the required level of precision. Each such location may even be marked with numbers 1, 2, 3 (or 1/2/3 dots), all of course superimposed onto the picture. Later in the sequence, as the child demonstrates mastery, the numbers 1, 2, 3 may be removed, or the circle may be shown only when the child hovers over the right location, and so forth. Any suitable gamification technique may be provided such as oral words of praise for the child or rewards for successful learning such as virtual points.

According to certain embodiments, a child selecting a difficult-to-find location may receive a warning (e.g. if the child selects a location and an image processing functionality determines that this location corresponds, within the child's selected picture, to a location including no edges such as a sky location). Conversely, if the location selected falls on edges in the picture (e.g. the cow's nose, or the flower's petal which is about the same size as the required precision level, or the intersection between the path and the tree), no warning is provided or a positive message is provided.

In the picture library stored in the picture database, each digitally represented picture may include solid blocks or areas of colors with clear edges between them as opposed to gradations of color as in a natural scene. For each picture, N e.g. (say) 50 pre-determined locations may be stored, corresponding to locations which a child can easily find repeatedly. These may be determined manually. e.g. by the graphic artist which provided the pictures, or may be found by suitable edge detection functionality. Typically, when a child—typically teacher-supervised-selects his password, an initial password is suggested to him, e.g. the system's test-configuring functionality, e.g. by showing the child a picture randomly or otherwise selected by the test-configuring functionality, on which n (say 3) typically system-selected locations (which may be randomly selected from among the N) are pre-marked.

An advantage of a test-configuring functionality operative for suggesting a plurality of n initial locations to the child, is that the child can then easily interact with the test-configuring functionality to modify the password that has been seen on his workstation's screen, what amounts to an illustration of one possible password. Typically, the test-configuring functionality allows the child to modify her or his password by:

a. showing the child her or his picture, on which the current locations constituting the child's password are marked (e.g. by a red dot)

b. superimposing an indication of order on the picture e.g. by marking the first, second, third . . . locations in a password defined as a sequence of locations. For example, the password is: tip of dog's tail followed by tip of sun's ray and finally by point at which house intersects with barn. The picture is then displayed to the child on her workstation and a 1 appears adjacent to the red dot marking the tip of the dog's tail; a 2 appears adjacent to the red dot marking the tip of sun's ray and a 3 appears adjacent to the red dot marking the point at which house intersects with barn.

c. detecting a user action of simply moving a number 1 marking a location such as the cow's ear, to a different location such as the cat's nose. Number 2 might be moved from the top of the chimney to the bird's nest in the tree, and so forth. A "move" may be defined, if the user input device is a mouse, by a first click at the old location, followed by rolling of the cursor and a second click in the new location.

d. interpreting these user actions as changes in the user's password. For example, if the user's password was the following sequence: cow's ear; chimney top; kitten's eye; the user's password would now be: cat's nose; bird's nest; kitten's eye.

e. storing, for each individual end-user, the user-selected modification as the individual end-user's password comprising locations predetermined by him; or if no user-selected modification exists for an individual end-user, storing original system-selected location/s as the individual end-user's password.

Another advantage of the test-configuring functionality shown and described herein is that there is then only one procedure to teach the child, namely how to modify a password, and there is no need to teach the child one procedure for initially selecting his password and a different procedure for modifying a password already selected. Typically, instead of initially selecting his password, the child interacts with the test-configuring functionality to modify a password selected for him.

The login system typically uses signed cookies (created e.g. on the server) to enable the system to support a single sign on between the various sites that provide the service.

The system may support several User roles e.g. all or any subset of the following roles:

System Administrator—this role enables to manage the system. It enables to create modify and delete accounts of all types and to reset passwords ("trusted authority")

Organization administrator—Organization administrators can create classes, assign them to teachers and access organizational statistics.

Teacher ("trusted user")

Staff member

Student ("child user")

Parent/adult carer

Content Management User 2 separate levels of Login may be supported: Primary Login and Secondary Login; so as to define separate modes such as class mode and home mode.

Primary login uses conventional username and password notation.

Any suitable technology may be used for Primary login e.g. Microsoft .Net Forms authentication or Open Authentication O-Auth.

Typically, the technology facilitates a secure sessionless connection between the client and the servers to promote efficiency of the servers which do not need to maintain state and to provide for easy scaling of the system e.g. by adding front end servers; since there is no session, consecutive requests from a single client can be served by different front end servers.

---

If the user identifies himself during primary login as a teacher then
{
    Secondary Login happens, e.g. some or all of:
    The system shows the list of students and requests a secondary identification
    the identification is by means of pointing on the student name from the list that
is shown (the class list + teacher + staff)
    and then the appropriate picture login is shown and the ordered clicks on the
picture password are checked.
    IF correct password has been clicked (right places at the right order)
    {
        The system marks to itself that it is in "Class Mode" and Marks the
student that is now working.
        (by means of StudentID and signed cookie -
        so from here on each access to the server has 2 approved Identities:
            Teacher + Student to show that we are in class mode
            and give the class identity (classes are typically id'ed by

```
            teacher since teacher is unique to class) and the identity
            of the student that is now working).
                The user is transferred to the application selection page - (e.g. a
    "What would you like to do now" page).
                At this stage when in home mode, the parent / adult carer can login using a
    PIN-based a secondary login process; analogously, a teacher can typically log in,
    identifying himself or herself using her or his PIN, when the child is at kindergarten,
    working in class mode.
            }
    }
    Else if the user identify himself during the primary login as a student then
    {
        The system marks to itself that it is in "Home Mode" and Marks the student
    that is now working.
        The user is transferred to the application selection page - (What would you
    like to do now).
    }
```

Typically, when a user logs in (primary login) to the system (SSL is enforced—so as not to pass credentials in the clear) the user credentials (username and password) are checked (password may be stored securely e.g. using a one way encryption algorithm (to disable the ability of retrieving user passwords). If the credentials are matched, the server typically creates a "login cookie". The cookie typically includes user id cookie expiration time which is typically encrypted and signed. The signature is typically added to the cookie. The cookie is typically returned as part of the response to the login request, typically together with a success indication whereas in case of failure, there is typically no indication whether the username and/or password were incorrect.

From that point, each request that the client sends to the server typically includes the "login cookie". The server validates the signature and if correct typically entitles the user that is assigned to it to grant the right permissions to that user (For example access to personal data—private address book, class resources etc.).

The teacher role is a "special case". Teacher credentials typically enable teachers, once they have authenticated themselves e.g. by entering a PIN, e.g. to a work-session of a child end-user associated with that teacher, to perform operations of 2 types:

Teacher's functions may include:
 a. Manage the class definitions (for example manage the student list, define for each student his responsible adult email address, send student user names and passwords to the responsible adults.) and/or
 b. Use the tools with the teacher's identity (for example read the email sent to the teacher and reply to the students, define new charts and polls using how much/ how many).

Student's functions: students may use the system in "class mode" as opposed to using the system in "home mode" (from home). Typically these modes are not child-user selectable; instead different login levels are typically required.

When students use the system from home, they typically log in with their credentials which grants them a role of student. This allows them to use the tools from home. Not all activities that are defined for usage in class are necessarily open for usage at home and not all home activities are necessarily open in the class. For example, the system might be configured such that private address book is managed only from home mode, or teachers can decide to use some of their polls only in "class mode".

Typically, when students use the system at class, they need to identify themselves. The system typically displays a list of all students, typically also of the teacher and the staff. Each name (student/teacher/staff) can be accompanied by a symbol or a picture. Typically, pictures typically enjoy privacy; e.g. only members of a class have access to the pictures of the students in the class. This may be achieved using a special "Picture service". The service receives a picture code (built of a Class-ID+Student-ID+Picture-Version) which validates that the "login cookie" has permission to access it and, if it has access, it returns the requested image. Clicking on the teacher name pops up a modal dialog that requests the teacher PIN (in order to prevent students from accessing the "teacher's functions" (1.a and 1.b in the list above). Only after keying the correct key, the teacher can proceed to using the "teacher's functions".

Typically, only after the student thus identify themselves, a "Picture Login" system is used.

The "Picture Login" system typically maintains, in the picture database of FIG. 1, a list of images available for "Picture Login". Each image typically contains several memorable points. For each student the system typically stores a link to the picture of the student and 3 (say) pairs of ordered (x,y) coordinates. The student is expected to point and click/tap (e.g. in the right order) on the points of interest selected as his password.) When the student (child end-user) completes clicking/tapping (say 3 times) the client transfers the ID of the selected student+the 3 coordinates that the student clicked to the server. The server typically verifies that the clicked coordinates are near the 3 ordered (x,y) coordinate pair of the student—e.g. within a given radius whose size fits the coordination and ability of young children. The server also typically validates that the student belongs to the class of the logged in teacher using the "login cookie". If all is OK, the system typically creates a second cookie "Picture Login Cookie" that typically comprises a Student-ID+Time. The system then signs on the cookie and the signature is added to the cookie. From that point and on each time a request is sent to the server, both cookies are typically passed and both cookies are checked, e.g. for existence, tampering and/or content. Based on the cookies, access is granted to data.

When pointing and clicking/tapping on the picture password the user typically has the ability to restart the cycle. (even if he did not click/tap 3 times).

Figure 3:
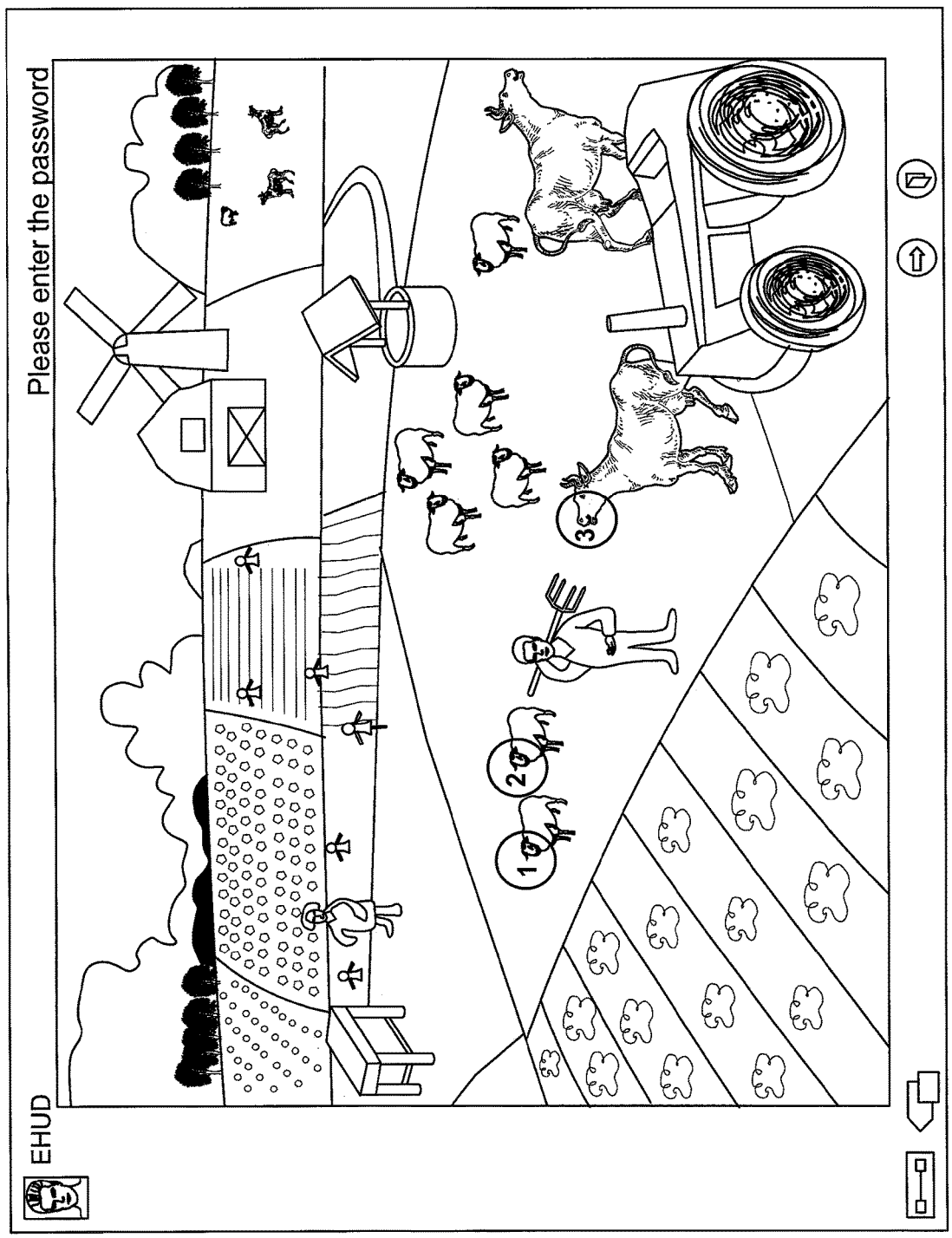
FIG. 3 is a simplified pictorial illustration of a display including an image and an overlaid sequence of (initially) numbered locations, displayed only before the child takes the authentication test (selects locations in the picture/image) or also while the child takes the test, all in accordance with certain embodiments.

If the student does not remember his password, he can typically request help from the teacher. The teacher (after entering the "teacher PIN", typically within a work session of a child-user associated with the teacher, typically on a workstation associated with the teacher and child's class) can then:

1. Take the "quick route" for the child (postpone the teaching/training of password and revert the student straight to the task he needs to perform) by indicating that she identified the student and grant him access to the system although the student did not click/tap the picture password.
2. show the child the password. Typically the system draws 3 circles with numbers reflecting the click/tap order e.g. as shown in FIG. 3. The teacher (or other predefined role) can then move the points and position them at any location on the picture. The teacher can also replace the picture e.g. by selecting the picture from a list or uploading a new picture.
3. start a training (c-learning) session that, using gamification techniques, trains the student to remember and correctly key the picture password. The training session is built of stages. Each stage is repeated until a stop-criterion is reached e.g. the students complete the password remembering task correctly n times in a row. The training session typically uses voice to instruct the student what to do and gives visual and voice feedback.

The training stages may include some or all of the following e.g. as shown in FIG. 4:

In a first stage, the system draws on the picture n, e.g. 3 numbered circles (e.g. with half transparent background) indicating the location and order of the password. The system requests the student to click/tap on them in the right order (1-3). Each time that the student taps correctly he gets positive feedback (e.g. a voice and/or pleasant icon such as a smiley face that appears on the tapped point or location). If the student fails to tap at the right location he gets voice feedback and the system hints to him of the right place to click/tap. The count of N, e.g. 3 good cycles is typically reset to 0. If the student clicks/taps correctly on the n'th e.g. $3^{rd}$ point and there was no error during this cycle, the number of correct cycles is incremented. If this was the $N^{rd}$ cycle, the level ("stage") is advanced to level/stage 2.

In a second stage the system shows n, e.g. 3 empty circles (with a border and/or transparent background—no numbers) on the screen and requests the student to click/tap on them using the right order (that he learned during level 1). Each time that the student taps correctly, he gets positive feedback (e.g. by voice and smiley face that appears on the tapped point). If the student fails to tap at the right location he gets voice feedback and the system hints of the right place to click/tap. The count of N, e.g. 3 good cycles is typically reset to 0. If the student clicks/taps correctly on the n'th e.g. $3^{rd}$ point and there was no error during this cycle, the number of correct cycles is incremented. If this was the $N^{rd}$ cycle, the level ("stage") is advanced to level/stage 3.

In a third stage the system does not show circles on the screen, and instead just shows the picture without overlay. The system may orally request the student to click/tap on the circles using the right order. Each time that the student taps correctly he gets positive feedback (by means of voice and a smiley face that appears on the tapped point). If the student fails to tap at the right location he gets voice feedback and the system hints him of the right place to click/tap. (The count of n, e.g. 3 good cycles is reset to 0). If the student clicks/taps correctly on the n'th e.g. $3^{rd}$ point and there was no error during this cycle, the number of correct cycles is incremented. If this was the $3^{rd}$ cycle, the training is complete and the student is requested to tap the password (with no feedback—same as in a regular picture password login). At the completion of the login the student is granted access to the system.

More generally, the c-learning of the password typically includes stages varying from easy to hard, and differing from one another along some or all of the following dimensions:

a. password locations are displayed during the entire time period in which child enters password (easy; child is training to enter accurately not to remember) vs. password locations are displayed transiently just before child enters password (as "hints") and then disappear (intermediate; child is training to remember) vs. password locations are not displayed at all (hard; child is being tested as to whether or not he remembers)

b. when displayed, password locations are (easy)/are not (hard) numbered or the order between them is/is not otherwise marked e.g. next password location to be clicked upon blinks or is otherwise stressed, whereas other password locations do not blink.

c. Typically, feedback is provided in all stages; however feedback may be provided after each location is clicked (easy) or only after all locations have been clicked, rightly or wrongly (hard).

The first time a student logs in (using "picture login") the server may randomly pick a picture for the student. Each picture has a large list of predefined points of interest stored at the server, in the picture database. The server typically picks randomly a set of n e.g. 3 points and sets them as the student's first picture password.

The system typically keeps statistics of login attempts and/or logs of training sessions so teachers can track students who need attention e.g. who get alerts re violations of code of conduct e.g. when a student spams, or tries to take the identity of, a different student.

The system typically logs activity for both login methods (primary, secondary), typically storing the login times and shows usage statistics in various ways to help measure deployment and usage.

An example sequence of classroom login operations, some or all of which may be supported by certain embodiments, e.g. Password training through gamification and or request-help operations, is now described in detail with reference to FIG. 2. The system may provide the child end-user with incentives such as badges; however this is not shown for simplicity.

Step 1: The student (also termed herein "child") is shown a list of all children in his class and clicks on his name.

Step 2: The system's testing functionality shows the picture that is associated with the student and prompts the student to input his password (IE: click at the right places in the right order)

Step 3: Student requests assistance and the teacher comes the student indicates that he requests assistance e.g. by pressing on the help option on the screen. Responsively a modal popup may appear on the child's screen, requesting the Teacher Pin. Typically, the teacher gets her PIN together with her account information when she starts using the service. She can then modify her PIN if desired. After the teacher enters her PIN he or she gets access to the teacher options panel.

Step 4: Teacher selects an Option either for all end-users in her class or for an individual. Some or all of the following 3 options may be displayed on the screen at this point:

i. Approve the student's identity and enable the student to immediately proceed with his tasks. If the teacher is now physically standing by the student, she can identify him in person and approve his identity.

ii. Display/Modify the student's Password.

This option enables the teacher to see the student's password and modify it.

iii. Start a training session for the student whereby using "gamification" the system's e-learning functionality trains the student to remember and accurately enter his password.

Step 5: interact with the test configuring functionality to Modify Password, e.g. based on a display of an existing pictorial password The end-user child and/or her teacher can typically interact with the test configuring functionality by moving the password points (which may be marked e.g. using numbers—overlaying the picture) and/or by replacing the image, substituting e.g. another image in the picture database. Alternatively, there may be an option to upload personalized pictures.

Step 6: Password training game guided by the system's e-learning functionality that typically speaks/guides and encourages the student to learn the password. Levels may be defined e.g. including an initial level where all points (locations currently defining a particular child's password) are both marked and numbered. When the student clicks correctly, the system may give him visual feedback e.g. a smiley and/or audio feedback (Good Job). In a medium level the locations currently defining a particular child's password may be marked but not numbered.

The system's e-learning functionality typically explains to the child and measures success. The goal may be to reach a predefined success criterion e.g. 3 "clean" rounds in a row (clean=rounds without failures where all clicks/taps were in place and in the right order). After the criterion is achieved, the system moves to the next level. During the Next Level the system may not mark locations constantly; instead the e-learning functionality may briefly mark the locations; but this hint disappears after a second.

The system typically continues to give visual and audio feedback to inform the child whether or not his selection of locations was correct and in order.

During the last level, the system may not even give hints to aid the child in selecting locations; instead the system's e-learning functionality may only give a posteriori feedback.

After the success criterion e.g. completing 3 "clean rounds" of successful password entry, has been achieved, the training session is terminated by the system's e-learning functionality; the system then switches to password entry mode which may be governed by the system's testing functionality.

In any level if the student fails during a password entry session the count toward 3 "clean rounds" (say) typically re-starts from the beginning.

At any time during the session the student can typically stop the training by exiting/or changing the user.

At any time the student can typically request help and then the teacher can either approve his identity, modify his password or restart his training session.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A secured computerized system comprising:
a computerized environment secured to prevent access thereto, other than by end-users who have passed a what-you-know authentication test;
a what-you-know testing functionality operative for administering a what-you-know user authentication test to at least one end-user, including presenting at least one image to an end-user, and using a processor for approving the end-user to enter the computerized environment if the end-user correctly selects at least one predetermined location within the image; and
a graphic what-you-know test-configuring functionality operative for:
displaying at least one system-selected location within the image;
providing a graphic interface operative for accepting, from at least one end-user, a user-selected modification of the at least one system-selected location; and
storing in a computer-implemented memory, for each individual end-user, the user-selected modification as the individual end-user's at least one predetermined location; or if no user-selected modification exists for an individual end-user, storing said system-selected location as the individual end-user's predetermined location,
wherein the system also comprises an e-learning functionality operative to train at least one end-user to remember her or his at least one predetermined location.

2. A system according to claim 1 wherein said at least one location comprises a point location and an end-user is deemed by said what-you-know testing functionality to have correctly selected a predetermined location if s/he has selected a location on the image as presented, whose distance from the point location is no more than a predetermined maximum, thereby to maintain a predetermined precision level.

3. A system according to claim 1 wherein said test-configuring interface is operative for randomly selecting an image to be displayed, from among a multiplicity of images.

4. A system according to claim 1 and also comprising a library of images storing a multiplicity of images, from which an image is selected for presentation.

5. A system according to claim 1 wherein at least one system-selected location within an individual image comprises a location within the individual image which is pre-stored in conjunction with the individual image.

6. A system according to claim 5 wherein at least one location is pre-stored in association with a characterization of the location as being suited to certain end-users and wherein said system-selected location is selected based at least partly on the characterization.

7. A system according to claim 1 wherein at least one system-selected location within an individual image comprises a location of a feature within the individual image which is detected using a feature-detection algorithm.

8. A system according to claim 7 wherein the feature comprises a predetermined location along an edge.

9. A system according to claim 7 wherein the feature comprises a corner.

10. A system according to claim 1 wherein said presenting at least one image comprises presenting an image selected from among a multiplicity of images pre-selected to include (a) areas of distinct color easily distinguishable by users as opposed to smoothly varying color; and/or (b) features which are both (b-1) numerous enough to provide a predetermined level of security; and/or (b-2) far enough apart to facilitate selection by an end-user capable of a predetermined level of precision.

11. A system according to claim 1 wherein the user-selected modification is entered by dragging from a current location and clicking to indicate a desired new location.

12. A system according to claim 1 and wherein a global trusted authority defines a plurality of local authority end-users and a corresponding plurality of groups of end-users, wherein each local authority end-user is known by the trusted authority to be personally acquainted with all end-users in the corresponding group from among the plurality of groups.

13. A system according to claim 12 wherein the system also comprises an access control override functionality operative to allow any individual local authority end-user, from among the plurality of local authority end-users, to manually authorize access to the computerized environment, but only for end-users within an individual group, from among the plurality of groups of end-users, which corresponds to the individual local authority end-user, thereby to provide manual over-riding of the what-you-know testing functionality by local authorities.

14. A system according to claim 13 wherein at least one of the user interfaces includes a call-local-authority option and wherein the override functionality is activated only after the call-local-authority option is selected.

15. A system according to claim 13 wherein the override functionality is activated only after the local authority has successfully identified herself/himself to the system.

16. A system according to claim 12 wherein the system also comprises a test-configuration override functionality operative to allow any individual local authority end-user, from among the plurality of local authority end-users, to change at least one said system-selected location, but only for end-users within an individual group, from among the plurality of groups of end-users, which corresponds to the individual local authority end-user.

17. A system according to claim 12 wherein the system also comprises a test-configuration override functionality operative to allow any individual local authority end-user, from among the plurality of local authority end-users, to select said image for presentation, but only to end-users within an individual group, from among the plurality of groups of end-users, which corresponds to the individual local authority end-user.

18. A system according to claim 1 wherein said at least one predetermined location comprises a plurality of predetermined locations.

19. A system according to claim 18 wherein said plurality of predetermined locations comprises a sequence of predetermined locations and said approving comprises approving the end-user to enter the computerized environment if the end-user enters the plurality of predetermined locations in a correct order which corresponds to said sequence.

20. A system according to claim 1 wherein said e-learning functionality gives the end-user audio feedback.

21. A system according to claim 1 wherein said e-learning functionality includes gamification functionality.

22. A system according to claim 1 wherein said access is granted by the what-you-know testing functionality only to low-threat child end-users pre-authorized by trusted special users.

23. A system according to claim 1 wherein said access is granted to an end-user logged onto a work-station thereby to define a work-session, if a trusted user authenticates herself on the end-user's work-station as part of the end-user's work session and then authorizes access for the end-user.

24. A system according to claim 1 wherein said e-learning functionality provides learning stages including a learning stage in which the at least one predetermined location is marked until the end-user has completed his selection thereof.

25. A system according to claim 1 wherein said e-learning functionality provides learning stages including a learning stage in which the at least one predetermined location is marked for a period of time shorter than that required by a typical end-user to complete his selection of the location.

26. A system according to claim 1 wherein said e-learning functionality provides learning stages including a learning stage in which the at least one predetermined location is not marked but in which feedback is provided after the end-user has completed his selection of locations which he believes comprise the predetermined locations.

27. A system according to claim 1 wherein said e-learning functionality provides learning stages including a learning stage in which a hint of a proper sequence in which a plurality of predetermined locations must be selected is provided.

28. A system according to claim 1 wherein said e-learning functionality provides learning stages including a learning stage in which a hint indicating only whereabouts of the plurality of predetermined locations without indicating the sequence thereof, is provided.

29. A computer program product, comprising a non-transitory tangible computer readable medium having computer readable program code embodied therein, said computer readable program code adapted to be executed to implement a method for securing a computerized environment to prevent access thereto, other than by end-users who have passed a what-you-know authentication test, said method comprising the following operations:
   using a what-you-know testing functionality for administering a what-you-know user authentication test to at least one end-user, including presenting at least one image to an end-user, and using a processor for approving the end-user to enter the computerized environment if the end-user correctly selects at least one predetermined location within the image;
   providing a graphic what-you-know test-configuring functionality operative for:
   displaying at least one system-selected location within the image;
   controlling a graphic interface operative for accepting, from at least one end-user, a user-selected modification of the at least one system-selected location; and
   controlling storage in a computer-implemented memory, for each individual end-user, of the user-selected modification as the individual end-user's at least one predetermined location; or if no user-selected modification exists for an individual end-user, storing said system-selected location as an individual end-user's predetermined location,
   wherein the method also comprises an e-learning functionality operative to train at least one end-user to remember her or his at least one predetermined location.

30. A secured computerized method comprising:
   providing a computerized environment secured to prevent access thereto, other than by end-users who have passed a what-you-know authentication test;
   using a what-you-know testing functionality operative for administering a what-you-know user authentication test to at least one end-user, including presenting at least one image to an end-user, and using a processor for approving the end-user to enter the computerized environment if the end-user correctly selects at least one predetermined location within the image; and providing a graphic what-you-know test-configuring functionality operative for:
  displaying at least one system-selected location within the image;
  controlling a graphic interface operative for accepting, from at least one end-user, a user-selected modification of the at least one system-selected location; and
  controlling storage in a computer-implemented memory, for each individual end-user, of the user-selected modification as the individual end-user's at least one predetermined location; or if no user-selected modification exists for an individual end-user, storing said system-selected location as the an individual end-user's predetermined location, wherein the method also comprises an e-learning functionality operative to train at least one end-user to remember her or his at least one predetermined location.

* * * * *